United States Patent Office 3,567,736
Patented Mar. 2, 1971

3,567,736
PROCESS FOR PRODUCING 2-PYRROLIDINONES
John M. Larkin, Hopewell Junction, and Kenneth L. Kreuz, Fishkill, N.Y., assignors to Texaco Inc., New York, N.Y.
No Drawing. Filed Dec. 18, 1967, Ser. No. 691,145
Int. Cl. C07d 27/08
U.S. Cl. 260—326.5
17 Claims

ABSTRACT OF THE DISCLOSURE

A method for preparing a 2-pyrrolidinone by contacting a dinitroalcohol having at least 5 carbon atoms corresponding to the formula:

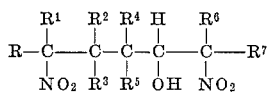

with an acidic oxidizing agent at a pH not exceeding 4 thereby forming a 4-nitroalkanoic acid of the formula:

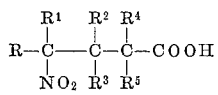

and thereafter hydrogenating the 4-nitroalkanoic acid in an alcoholic medium in the presence of a minor amount of a mineral acid and a hydrogenation catalyst preferably selected from the groups of platinum metals at temperatures ranging from about 20 to 200° C. and under hydrogen pressures of from 1 to 100 atmospheres. The 2-pyrrolidinones contemplated correspond to the formula:

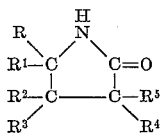

and are useful as solvents for polymers, insecticides and petroleum processing and separation; as plasticizers for acrylic polymers and copolymers; and as decolorizing agents.

---

This invention relates to a process for producing 2-pyrolidinones. In particular, it relates to a novel method for preparing 2-pyrrolidinones from dinitroalcohols.

In the past preparation of 2-pyrrolidinone has been accomplished by the hydrogenation and cyclization of succinonitrile; also known is the synthesis of 2-pyrrolidinone from acetylene, formaldehyde and ammonia. Although such reactions produced 2-pyrrolidinones certain disadvantages were attendant in the method of preparation including costly starting materials, the necessity to utilize high pressure reactions and reactors and, where substituted pyrrolidinones were desired, costly procedures were required to be employed.

A method has now been found whereby 2-pyrrolidinone and substituted 2-pyrrolidinones can be produced in high yields and in the substantial absence of by-product formation which permits processing without the necessity of utilizing complicated and expensive purification procedures. Moreover, by the process of this invention more direct and economical routes are set forth for the preparation of substituted pyrrolidinones. Further the process is amenable to the preparation of 2-pyrrolidinones where substantially lower processing pressures are employed.

It is therefore an object of this invention to provide a method for the preparation of 2-pyrrolidinones.

Another object of this invention is to provide a method for the preparation of 2-pyrrolidinones in high yields.

Yet another object of this invention is to provide a method for the preparaton of 2-pyrrolidinones in the absence of substantial by-product formation.

Other objects and advantages will become apparent from a reading of the following detailed description and examples.

Broadly, this invention contemplates a method of preparing a 2-pyrrolidinone which comprises contacting a dinitroalcohol having at least 5 carbon atoms and corresponding to the formula:

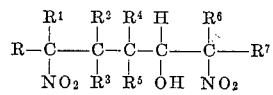

where R is hydrogen or an alkyl group having from 1 to 95, and preferably from 1 to 20 carbon atoms, and where $R^1$, $R^2$, $R^3$, $R^4$, $R^5$, $R^6$ and $R^7$ are hydrogen or alkyl groups having from 1 to 10 preferably from 1 to 6 carbon atoms and where $R^6$ and $R^7$ are most preferably hydrogen, with an acidic oxidizing agent at a pH not exceeding 4 and preferably not above 2 thereby forming a 4-nitroalkanoic acid of the formula:

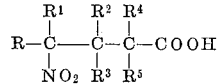

where R, $R^1$, $R^2$, $R^3$, $R^4$ and $R^5$ are as defined above. Thereafter the 4-nitroalkanoic acid is hydrogenated in an alcoholic medium in the presence of a mineral acid and a hydrogenation catalyst. The catalyst is preferably selected from the groups of platinum metals catalysts and the hydrogenation is conducted at temperatures of from 20° C. to 200° C. under a hydrogen pressure of from 1 to 100 atmospheres.

According to this invention the contemplated 2-pyrrolidinones correspond to the formula:

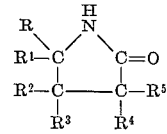

where R, $R^1$, $R^2$, $R^3$, $R^4$ and $R^5$ are as hereinbefore defined.

The dinitroalcohols contemplated as starting materials in the instant invention include as for example 1,5-dinitro-2-pentanol,
1,5-dinitro-4-methyl-2-pentanol,
1,5-dinitro-3-methyl-2-pentanol,
1,5-dinitro-2-hexanol,
2,6-dinitro-3-hexanol,
1,5-dinitro-2-octadecanol,
1,5-dinitro-3-methyl-2-dodecanol,
1,5-dinitro-8-ethyl-2-dodecanol,
2,6-dinitro-3-eicosanol and
1,5-dinitro-2-docosanol.

Such dinitroalcohols contemplated as starting materials above may be prepared, for example, by contacting substituted and unsubstituted olefins having at least 5 carbon atoms such as 1-pentenes, 1-hexenes, 2-hexenes, 1-octenes, 1-octadecenes, 4-nonenes, etc. with dinitrogen tetrioxide and oxygen at a temperature of between —40 and 20° C. to form a nitroalkyl peroxynitrate. The intermediate nitroalkyl peroxy nitrate is thereafter contacted with a reducing agent at a temperature of between —20 and 30° C. to form a vicinal nitroalkyl nitrate in accordance with the procedure described in the U.S. Pat. 3,282,983. The vicinal nitroalkyl nitrate so prepared is subsequently converted to the dinitroalcohol by heating the nitrate at a temperature of at least 100° C. thereby thermally rearranging the vicinal nitroalkyl nitrate to a dinitroalcohol in accordance with the procedure described in copending application Ser. No. 686,820 filed Nov. 30, 1967 (D 70,515) etitled, "Preparation of Dinitroalcohols," by John M. Larkin and assigned to the assignee hereof.

More specifically the overall process of the invention is defined in the following stages:

Stage 1.—The first stage of the process of the invention comprises contacting a dinitroalcohol as hereinabove defined with an aqueous oxidizing agent, employed at a reactor pH not exceeding 4 and preferably not above 2 thereby forming a 4-nitroalkanoic acid.

Illustrative of the contemplated oxidizing agents we mention peroxysulfuric acid, peroxydisulfuric acid, acidified solutions of salts of permanganic acid, chromic acid, and perchloric acid such as potassium permanganate and sulfuric acid, sodium permanganate and sulfuric acid, sodium dichromate and phosphoric acid, potassium dichromate and sulfuric acid, potassium perchlorate and sulfuric acid and sodium perchlorate and phosphoric acid. While the mechanism of this transformation is not clearly known it is believed to proceed first by the oxidation of the dinitroalcohol to a dinitroalkanone which in turn undergoes hydrolytic cleavage to a 4-nitroalkanoic acid.

The reaction temperatures employed in our first stage may vary between about 20 and 150° C. and preferably between 50 and 100° C. Temperatures above 150° C. promote the formation of oxidation products and other undesirable side reactions while temperatures below 20° C. excessively prolong reaction times. The amount of oxidizing agent employed is essentially stoichiometric but practical amounts may range between about 0.9 to 1.1 oxygen equivalents of agent per mole of dinitroalcohol. The reaction time is normally between a few minutes and 24 hours although longer and shorter periods may be employed.

The 4-nitroalkanoic acid prepared above may be recovered, if desired, by standard means as for example by selective distillation and extraction. Illustrative of the 4-nitroalkanoic acids prepared in the first stage of this process include 4-nitroeicosanoic acid, 4-nitrobutyric acid, 4-nitro-3-methylbutyric acid, 4-nitro-2-methylbutyric acid, 4-nitro-2-ethylbutyric acid, 4-nitro-3,3-dimethylbutyric acid, 4-nitrovaleric acid, 4-nitro-2-methyl-3,3-diethylvaleric acid, 4-nitro-2,4-dimethylhexanoic acid, 4-nitrododecanoic acid, 4-nitroheptadecanoic acid, 4-nitro-2-methylundecanoic acid, 4-nitro-2-ethylundecanoic acid, 4-nitrooctadecanoic acid and 4-nitrouncosanoic acid.

Stage 2.—The 4-nitroalkanoic acid prepared above and recovered, if desired from the first stage is converted to a 2-pyrrolidinone in quantitative yield by hydrogentaion in an alcoholic medium in the presence of minor amount of a mineral acid and a hydrogenation catalyst preferably selected from the groups of platinum metals, at temperatures ranging from about 20 to 200° C. preferably from 60 to 120° C., under hydrogen pressures ranging from 1 to 100 atmospheres of hydrogen and preferably between 5 and 40 atmospheres of hydrogen.

In general, conventional and well-known hydrogenation catalysts may be employed in this stage of the process including nickel, cobalt, iron and rhenium metals or compounds thereof, supported or unsupported and with or without promoters. Preferably we employ platinum metals catalysts including the light platinum group comprising ruthenium, rhodium and palladium and the heavy platinum group comprising osmium, iridium and platinum. The catalyst may be employed as the respective metal oxide or salt such as platinum dichloride, palladium dichloride, rhodium oxide, rhodium trichloride, ruthenium trichloride, iridium dichloride, osmium tetrachloride, platinum and palladium. Preferably we employ platinum dichloride and palladium dichloride.

Applicable mineral acids include hydrochloric acid, sulfuric acid, phosphoric acid, nitric acid, and para-toluene sulfonic acid. Preferably we employ hydrochloric acid.

Alcoholic media employed in this invention include liquid alkanols such as methanol, ethanol, propanol, isopropanol, butanol, isobutanol, hexanol, octanol, isooctanol and dodecanol. Preferably we employ alcohols having from 1 to 8 carbon atoms.

The amount of mineral acid employed in this stage of the reaction may vary from about 0.001 to 0.1 equivalent, preferably 0.01 to 0.05 equivalent of acid per mole of 4-nitroalkanoic acid. The amount of catalyst may vary from about 0.001 to 20 weight percent, preferably 0.1 to 1.0, based on the weight of 4-nitroalkanoic acid. Reaction times of from about 0.25 to 8 hours are customarily employed although longer and shorter periods may be applicable.

The 2-pyrrolidinone product is thereafter recovered by standard recovery procedures, for example by filtration of the catalyst followed by distillation of the alcoholic medium. Inasmuch as the conversion of the 4-nitroalkanoic acid to the corresponding 2-pyrrolidinone is quantitative the recovered produce is of high quality and purity.

The 2-pyrrolidinones prepared according to this invention are useful as a solvent for polymers and insecticides, as a solvent in petroleum processing, as a plasticizer for acrylic polymers and copolymers, and as a decolorizing agent for kerosene and other hydrocarbons. Further they are useful as intermediates in the preparation of 1-methyl-2-pyrrolidinone and 1-vinyl-2-pyrrolidinone. Moreover, 2-pyrrolidinone may be based catalyzed to a high molecular weight linear nylon-like polyamide.

In order to more fully illustrate the nature of our invention and manner of practicing the same the following examples are presented.

EXAMPLE I

A baseous mixture of dinitrogen tetroxide (168 grams) and oxygen in an approximate respective molar ratio of 1:4 was introduced into a solution of 140 grams of 1-pentene in 1190 milliliters of carbon tetrachloride maintained at 10–18° F. during a period of 2¾ hours. Approximately 2 moles (60 grams) of gaseous nitric oxide was added at 10–18° F. The mixture was purged with nitrogen, and the solvent stripped under vacuum at about 35–40° C. 1-nitro-2-pentyl nitrate (286 grams) was thus obtained as a yellow liquid.

A solution of 8.00 grams of 1-nitro-2-pentyl nitrate prepared above was dissolved in 80 milliliters of o-dichlorobenzene under a nitrogen atmosphere. The solution was heated and maintained at a reflux temperature for 19 minutes. The solvent was removed by distillation under reduced pressure (65–70° C. and 15 mm.) and 6.41 grams of 1,5-dinitro-2-pentanol was obtained.

To a mixture of 3.87 grams of 1,5-dinitro-2-pentanol prepared above in a solution of 28 milliliters of concentrated sulfuric acid and 200 milliliters of water, there was added 14.2 grams of potassium permanganate over a period of 15 minutes. The solution temperature rose to 60° C. and a brown precipitate formed. Solid bisulfite was added until the solution became clear and colorless. The solution was cooled to ambient temperature during a period of two hours and subsequently extracted with four 120 milliliter portions of ether. The combined ethereal extracts were dried over anhydrous magnesium sulfate, and the solvent was removed under vacuum at room temperature. The yellow liquid which remained weighed 2.66 grams (92% yield) and was identified by infrared to be 4-nitrobutyric acid.

There is prepared 15.0 grams of 4-nitrobutyric acid by the procedures described above. To a solution of 15.0 grams of 4-nitrobutyric acid and 300 milliliters of methanol there was added 1.0 gram of 10% palladium dichloride supported on carbon and 0.5 milliliter of concentrated hydrochloric acid. This mixture was charged to a reactor, and the reactor pressured to 500 p.s.i. with hydrogen. The reactor was rocked at 200–206° F. for 4 hours.

The solution was thereafter cooled, and the catalyst removed by filtration. The solvent was removed by evaporation under vacuum at about 40° C. A clear liquid weighing 9.52 grams (99.4% yield) was recovered and identified by infrared to be 2-pyrrolidinone.

EXAMPLE II

A solution of 4.2 grams of 1-hexene was dissolved in 55 milliliters of carbon tetrachloride, and the solution was maintained at 0-5° C. while 4.6 grams of dinitrogen tetroxide was introduced in a stream of oxygen (60 ml./min.) during a 6 hour period. The solution was purged with nitrogen, and gaseous nitric oxide was introduced for 22 minutes at the rate of 60.5 milliliters per minute while maintaining the solution at −10 to −15° C. The solution was stirred at −10° C. for an additional 10 min., and then was allowed to assume ambient temperature. The solvent was removed by evaporation under vacuum at approximately 40° C. There remained 8.49 grams (89% yield) of 1-nitro-2-hexyl nitrate.

A solution of 6.00 grams of 1-nitro-2-hexyl nitrate prepared above in 100 milliliters of o-dichlorobenzene was heated at reflux (176–179° C.) in a nitrogen atmosphere for 18 minutes. The solution was cooled and the solvent was distilled at 108–117° C. at 80–85 mm. The brown liquid which remained was chromatographed on 100 grams of silica gel and 4.17 grams of 1,5-dinitro-2-hexanol was obtained.

The 1,5-dinitro-2-hexanol obtained above is added to a 20% solution of sulfuric acid in water, and for each equivalent of 1,5-dinitro-2-hexanol present, there is added 1 equivalent of sodium dichromate. The mixture is heated at 80° C. for 2 hours and thereafter cooled and 4-nitrovaleric acid extracted with ether. The ether is evaporated, and 4-nitrovaleric acid is obtained.

The 4-nitrovaleric acid so obtained is dissolved in ethanol (1 part of 4-nitrovaleric acid per 10 parts of ethanol) and the solution is charged into a hydrogenation reactor to which is added 0.01 part platinum and 0.05 part sulfuric acid per 10 parts of 4-nitrovaleric acid. The mixture is agitated under 20 atmospheres of hydrogen pressure at 120° C. for 6 hours. The catalyst is recovered by filtration and the ethanol is removed by distillation. The product is 5-methyl-2-pyrrolidinone.

We claim:
1. A method of preparing a 2-pyrrolidinone which comprises:
(a) contacting a dinitroalcohol corresponding to the formula:

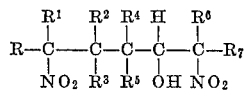

where R is hydrogen or an alkyl group having from 1 to 20 carbon atoms, where $R^1$, $R^2$, $R^3$, $R^4$, $R^5$, $R^6$ and $R^7$ are hydrogen or alkyl groups having from 1 to 10 carbon atoms with an acidic oxidizing agent at a pH not exceeding 4 thereby forming a 4-nitroalkanoic acid of the formula:

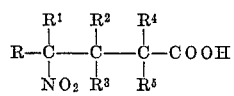

where R, $R^1$, $R^2$, $R^3$, $R^4$ and $R^5$ are as defined above, and
(b) hydrogenating said alkanoic acid in a liquid alkanol medium having from 1 to 12 carbon atoms in the presence of a mineral acid and a hydrogenation catalyst selected from the group consisting of metals, oxides and salts of nickel, cobalt, iron, rhenium and platinum metals groups.

2. A method according to claim 1 wherein said acidic oxidizing agent is an acidified solution of potassium permanganate acidified with sulfuric acid.

3. A method recording to claim 1 wherein said acidic oxidizing agent is an acidified solution of sodium dichromate acidified with sulfuric acid.

4. A method according to claim 1 wherein said acidic oxidizing agent is peroxysulfuric acid.

5. A method according to claim 1 wherein said oxidizing agent is present in an amount of about 0.9 to 1.1 oxygen equivalent of agent per mole of said dinitroalcohol.

6. A method according to claim 1 wherein step (a) is conducted at a temperature of from 20 to 150° C.

7. A method according to claim 1 wherein step (b) is conducted at a temperature of from 20 to 200° C.

8. A method according to claim 1 wherein said hydrogenation catalyst is selected from the broup consisting of metals, oxides and salts of the groups of platinum metals.

9. A method according to claim 8 wherein said catalyst is palladium dichloride.

10. A method according to claim 8 wherein said catalyst is platinum dichloride.

11. A method according to claim 1 wherein said alkanol medium is a $C_1$ to $C_8$ alcohol.

12. A method according to claim 1 wherein said mineral acid is hydrochloric acid.

13. A method according to claim 1 wherein said mineral acid is present in an amount of from about 0.001 to 0.1 equivalent per mol of 4-nitroalkanoic acid.

14. A method according to claim 1 wherein step (b) is conducted at a pressure of from 1 to 100 atmospheres of hydrogen.

15. A method according to claim 1 wherein said pyrrolidinone is 2-pyrrolidinone.

16. A method according to claim 1 wherein said pyrrolidinone is 5-methyl-2-pyrrolidinone.

17. A method of preparing a 2-pyrrolidinone which comprises:
(a) contacting a dinitroalcohol corresponding to the formula:

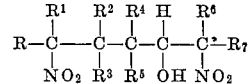

where R is hydrogen or an alkyl group having from 1 to 20 carbon atoms, where $R^1$, $R^2$, $R^3$, $R^4$, $R^5$, $R^6$ and $R^7$ are hydrogen or alkyl groups having from 1 to 6 carbon atoms with an acidic oxidizing agent comprising an acidified solution of potassium permanganate acidified with sulfuric acid at a pH not exceeding 2, thereby forming a 4-nitroalkanoic acid of the formula:

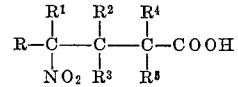

where R, $R^1$, $R^2$, $R^3$, $R^4$ and $R^5$ are as defined above, and
(b) hydrogenating said alkanoic acid in a $C_1$ to $C_8$ alkanol medium in the presence of hydrochloric acid and a palladium dichloride catalyst.

References Cited

FOREIGN PATENTS 1,167,024  11/1958  France _____ 260—326.5
1,402,663   5/1965  France _____ 260—326.5

OTHER REFERENCES

Theilheimer: Synthetic Methods of Organic Chemistry, vol. 6, (1952) p. 188, No. 521.

ALEX MAZEL, Primary Examiner

J. A. NARCAVAGE, Assistant Examiner

U.S. Cl. X.R.

260—531